Aug. 27, 1946.  P. C. SANDRETTO ET AL  2,406,406
RADIO DIRECTION FINDER
Filed July 24, 1941    4 Sheets-Sheet 3

Inventors
Peter C. Sandretto
Elmer P. Buckthal
By Thiess, Olsen + Mecklenburger
Attys.

Patented Aug. 27, 1946

2,406,406

UNITED STATES PATENT OFFICE 2,406,406

RADIO DIRECTION FINDER

Peter C. Sandretto, Chicago, and Elmer P. Buckthal, Brookfield, Ill., assignors to United Air Lines, Inc., Chicago, Ill., a corporation of Delaware Application July 24, 1941, Serial No. 403,802

17 Claims. (Cl. 250—11)

1

This invention relates to radio direction finders, more particularly to ground station radio direction finder systems for use at medium high frequencies, and the invention has for an object the provision of improved systems and apparatus of this character.

Radio direction finders utilizing antennas having directional sensitivity are of course known in the art, the usual practice being to employ two or more ground station direction finders tuned to the carrier frequency of the transmitter on an airplane or ship whose position is to be determined, whereby bearings may be obtained simultaneously at each station, and the position of the plane or ship located by triangulation. The medium high frequencies presently available for aircraft transmitters, however, are propagated by the ionosphere, and difficulties in obtaining accurate bearings at such frequencies have been encountered due to the various distortions and errors which are interjected by this propagating medium.

Examples of some of the errors recognized by the art as occurring in radio direction finders operating at such frequencies, and as to which various corrective attempts have been made, are observational errors due to fading and to the difficulty of distinguishing between a "crisp" null and a "hollow" null, deviation errors caused by minute-by-minute and second-by-second variations in the ionosphere, polarization errors due largely to horizontally polarized sky waves, and the various errors due to the presence of static. In spite of all corrective attempts which have heretofore been made, it is a well recognized fact that the bearing errors which occur even with the best equipment heretofore known, may be of such magnitude as to render substantially useless the bearings taken even by skilled operators.

It is accordingly a further object of this invention to provide a radio direction finder system for medium high frequency work capable of eliminating, correcting or minimizing substantially all of the known and recognized errors, and of substantially automatically providing permanent records of individual bearings of such character that unskilled operators may readily determine, by mere inspection of any group of records, the true bearing of the transmitting station.

In carrying out the invention in one form, a rotatable antenna arrangement is provided comprising a pair of spaced loops arranged in coaxial relation and a vertical non-directional antenna coincident with the axis of rotation, together with means for constantly rotating the entire

2 antenna arrangement, and selective means for connecting the two loop antennas in opposed parallel relation to suitable receiving means, or for connecting one of the loop antennas and the vertical antenna in parallel relation through a suitable coupling means or phase shifter to the receiving means.

The output of the receiving means, which preferably includes one or more fixed frequency oscillators adapted to beat together with the carrier supplied to the receiving means from the antennas, is connected by way of a rectifier to sensitive instrument means having a movable element adapted to trace a permanent record on a constantly moving recording surface. In order properly to orient the continuous record of signal intensity thus produced with respect to the compass position of the antenna arrangement, a switching device is provided associated with a rotating part of the antenna arrangement and connected in circuit with a second movable record tracing means, so that the recording surface will receive periodic indications of the relative position of the antenna arrangement from which the continuous record of the signal intensity may be properly oriented.

The present invention also includes within its scope the provision of means for rendering the output frequency of the receiving means independent of the carrier frequency supplied to the receiving means by the antenna arrangement, as well as automatic means for controlling the respective connections of the loop antennas and the vertical antenna to each other and to the receiving means, whereby accurate records may be obtained free from the usual bearing ambiguity and substantially uninfluenced by static conditions. In addition, means may be provided for insuring a constant phase displacement between the energy input from the vertical antenna and loop antennas, regardless of the carrier frequency, and if desired automatic volume control means may be employed so as to render the continuous records obtained from the improved system independent of variations in the intensity of the carrier.

For a more complete understanding of this invention, reference should now be had to the accompanying drawings in which.

Figure 1:
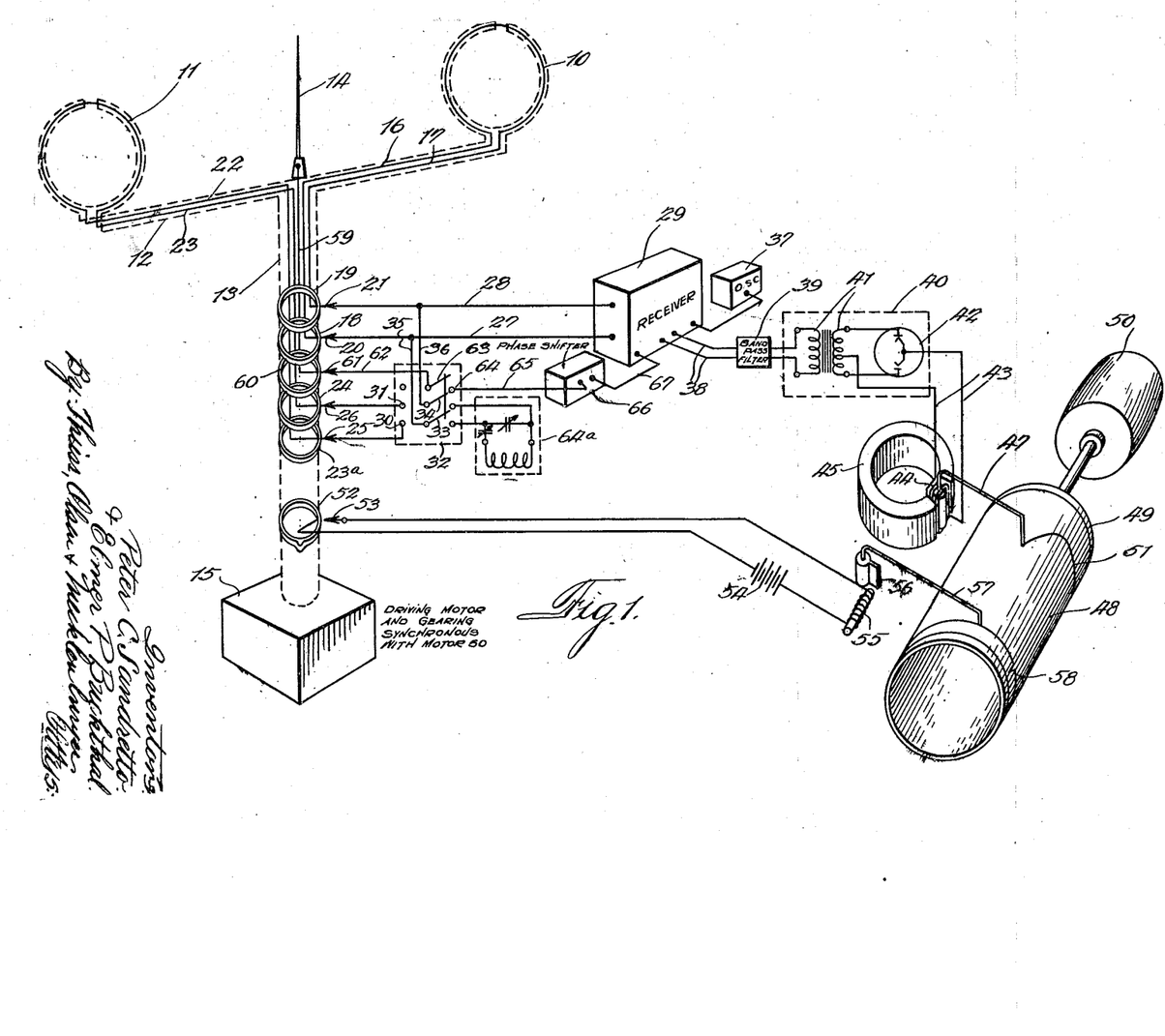
Fig. 1 is a somewhat diagrammatic representation of the circuit connections and the various operating parts of a radio direction finder embodying the present invention.

Referring now to Fig. 1, the invention is illustrated as embodied in a radio direction finder having rotatable antenna means comprising a pair of spaced apart shielded loop antennas 10 and 11, which are mounted in coaxial relation on opposite ends of a horizontally extending beam 12 secured for rotation on the upper end of a rotatable post 13, the beam 12 and the post 13 being shown in broken lines since the mechanical structure of these elements constitutes no part of the present invention. Intermediate the loop antennas 10 and 11 and mounted coincident with the axis of the post 13, is a vertical antenna 14, and the entire antenna arrangement is mounted on a suitable base 15 containing a driving motor and suitable gearing (not shown) for rotating the post 13 and the parts mounted thereon at a predetermined constant speed.

As shown, the loop antenna 10 is connected by suitable transmission lines 16 and 17 to a pair of slip rings 18 and 19, respectively carried by the rotatable post 13 and adapted to be engaged by suitable brushes 20 and 21. Similarly, the loop antenna 11 is connected by transmission lines 22 and 23 to the slip rings 23a and 24, respectively carried by the post 13 and adapted to be engaged by brushes 25 and 26 respectively. The brushes 20 and 21, which are associated as above described with the loop antenna 10, are permanently connected by means of suitable conductors 27 and 28 to the input of a radio receiver 29 which may be of the conventional type having the usual detectors, radio frequency amplifiers, intermediate frequency amplifiers, audio output, and necessary interconnections. The brushes 25 and 26, which are associated as above described with the loop antenna 11, are permanently connected to the stationary contacts 30 and 31 of a multiple pole double throw switching or coupling means 32, and it will be observed that when the switch is thrown to a left-hand position, as viewed in Fig. 1, the loop antenna 11 will be connected through the contacts 30 and 31, the switch blades 33 and 34, and the conductors 35 and 36 to the conductors 27 and 28 in the circuit of the loop antenna 10, the connections being such that the two loop antennas are connected to the input of the receiver 29 in opposed parallel relation.

Associated with the receiver 29 is a suitable oscillator means of fixed frequency, which will be further described hereafter and which is represented in Fig. 1 diagrammatically and indicated by the reference numeral 37. The oscillator means 37 beats with the carrier of the received signal, and produces at the output of the radio receiver 29 a beat note of predetermined frequency, the output being connected by suitable conductors 38 to a band-pass filter 39 capable of passing the beat note frequency. The filter 39 is connected, as shown, to a rectifier 40 which is illustrated as comprising a suitable transformer 41 and a full wave rectifier tube of the duo-diode type 42.

The output of the rectifier 40 is connected by the conductors 43 with the winding 44 of sensitive instrument means comprising a milliammeter which is illustrated as including, in addition to the coil 44, a permanent magnet 45 having an air gap within which the moving coil is mounted for rotation. Carried by the moving coil 44 is a suitable tracing element 47 which may include a suitable ink supply, not shown, and which is arranged to record the rectified output of the receiver on a chart or recording surface 48. The chart 48 is preferably carried, as shown, on a rotatable drum 49 which is driven at a constant speed by a suitable motor 50, the motor 50 being so synchronized with the driving motor of the antenna arrangement contained in the base 15 as to insure that the chart 48, which is graduated in the usual fashion to indicate degrees of movement, will move through a distance corresponding to 360° during each complete revolution of the antenna arrangement. Thus it will be seen that an ink trace, such as indicated by the reference numeral 51 in Fig. 1, will be produced on the chart 48 so as to provide a permanent record of the signal intensities supplied to the receiver 29 during rotation of the antenna arrangement.

In order properly to orient the ink traces on the chart 48 with the compass position of the antenna means, the rotatable post 13 of the antenna arrangement is provided with switching means including a rotating contact 52 which is adapted to engage a co-operating stationary contact 53 once during each revolution of the antenna arrangement. This switching means is connected, as shown, in circuit with a battery 54 and the energizing winding 55 of a relay, so that each time the contacts 52 and 53 close, the armature 56 of the relay will be attracted and a suitable tracing element 57, which is carried by the armature 56, will be operated to trace on the chart 48 a reference mark, such for example as the mark 58, which may be used to orient the ink trace 51 with the compass position of the antenna arrangement. For example, if the reference mark 58 corresponds to a true north-south position of the antenna loops 10 and 11, the relative compass positions of the various maximum and minimum intensity points indicated by the trace 51 may readily be determined.

While various other antenna arrangements known to the art, such for example as the Adcock antenna system connected to the receiver by means of a goniometer, may be utilized within the broad principles of this invention, the particular antenna arrangement illustrated in Fig. 1 has been found highly advantageous in eliminating polarization errors which may arise due to the presence of horizontally polarized sky waves.

When the antenna arrangement shown in Fig. 1 occupies a position such that the beam 12 is pointing directly at the transmitter station, a vertically polarized ground wave will of course induce equal and opposite voltages in the two sides of each of the loop antennas, and no signal will be supplied to the receiver 29 from the antenna arrangement. Likewise, when the beam 12 is at right angles to the direction of the transmitter, a vertically polarized ground wave will induce maximum voltage in each of the coaxially mounted antenna loops, but since these antenna loops are connected in opposed parallel relation, zero signal intensity will again be supplied to the receiver. Accordingly, with a substantially entirely vertically polarized wave, four nulls will occur during each revolution of the antenna arrangement and the permanent record produced on the chart 48 will thus show a null of zero or minimum signal intensity in each quadrant of each 360° record. Substantially entirely vertically polarized waves will be supplied to the antenna arrangement, however, only when a plane is leaving the airport where the antenna arrangement is located. At a distance of approximately 60 miles, utilizing medium high frequencies of the character heretofore indicated which may vary from 1.5 to 30 megacycles, it will be found that in addition to the vertically polarized ground wave there will be received at the antenna arrangement horizontally polarized sky waves propagated by the ionosphere, and that a distance of approximately 200 miles the ground wave will substantially disappear.

The horizontally polarized sky waves will of course induce in each of the loop antennas a voltage which cannot be eliminated merely by rotating one of the antennas, but, as in the case of a vertically polarized ground wave, the voltages induced in the two loop antennas, when the beam 12 occupies a position substantially at right angles to the direction of the transmitting station, will cancel out, due to the fact that the two loops are connected in opposed parallel relation and that in this position there will be no diversity error. In all other positions of the antenna arrangement a diversity error occurs due to the difference in time phase of the incoming waves with respect to the two spaced loops.

From the above it will be clear that as the antenna arrangement is rotated at a constant speed, there will be produced on the chart 48 a continuous record which will show either two or four positions of minimum or zero signal intensity during each revolution of the antenna arrangement, depending upon the character of the incoming wave, and accordingly there will be an ambiguity in the record since obviously only one of these positions of minimum signal intensity indicates the true bearing of the plane or transmitter station.

It is for the purpose of overcoming this bearing ambiguity that the vertical antenna 14 and its associated connections are provided, the vertical antenna being connected as shown by a transmission line 59 to a slip ring 60 carried by the rotating post 13, and a brush 61, which is arranged to contact the slip ring 60, connects the vertical antenna through a conductor 62 to the movable blade 63 of the switch 32. When the switch 32 is in its left-hand position, as previously described so as to connect the loop antennas 10 and 11 in opposed parallel relation, the vertical antenna 14 is open circuited and the continuous record or trace heretofore described is obtained. When, however, the switch 32 is thrown to a right-hand position, the loop antenna 11 is cut out of circuit and a suitable artificial antenna 64a is connected in parallel with the loop antenna 10 through the switch blades 33 and 34 in order to prevent unbalance of the system, and in addition the vertical antenna is connected through the knife blade 63, the switch contact 64, a conductor 65, a phase shifter or coupling means 66, which is shown diagrammatically in Fig. 1, and by way of conductor 67 to the receiver 29. The coupling means or phase shifter 66 insures that the energy received from the vertical antenna 14 will be displaced 90° from the energy received from the loop antenna 10 so that the well known cardioid pattern will be produced.

Thus, in order to obtain a continuous record with the direction finder illustrated in Fig. 1, which record will be free of any bearing ambiguity, it is necessary only to throw the switch 32 to its right-hand position for one or more revolutions of the antenna arrangement, whereby a cardioid pattern, having only one zero or minimum intensity position, will be produced on the chart 48, and thereafter to throw the switch 32 to its left-hand position so as to produce, during succeeding revolutions of the antenna arrangement, a continuous trace of the signal intensity of the character hereinbefore indicated.

The cardioid pattern itself cannot be used for determining the true bearing of the transmitter station, due to the polarization errors and the like which may cause a variation in the null of the cardioid of such great magnitude as to render the cardioid pattern useless from the bearing standpoint. The cardioid pattern will, however, indicate in what quadrant a plane or transmitting station is located, and the quadrant having thus been determined, the true bearing may readily be ascertained from the continuous records produced with the two loop antennas connected in parallel opposed relation as described above.

Figure 6:
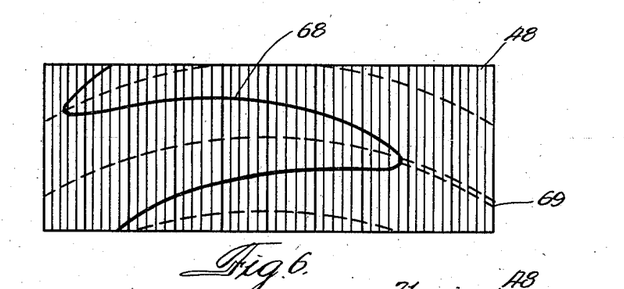
Figs. 6, 7, and 8 are illustrative bearing records which may be obtained under certain conditions in the operation of radio direction finder systems embodying this invention.

In Fig. 6 there is shown a typical trace 68 on a linear chart constituting a portion of the chart 48, which trace 68 represents a true bearing having a readily discernible null or minimum 69 which represents the true bearing of the plane or transmitter. By referring the point 69 to one of the reference marks 58 made by the tracing element 57 on the chart 48, the correct bearing of the transmitting station may readily be noted.

Figure 7:
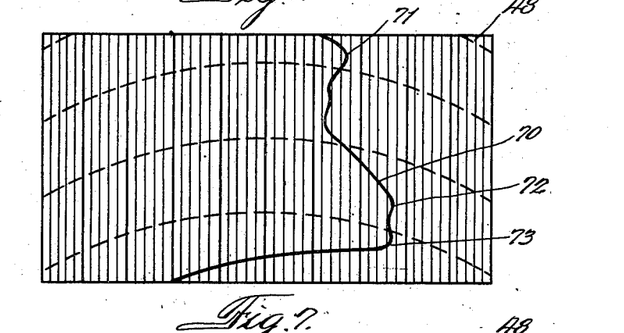
Figure 8:
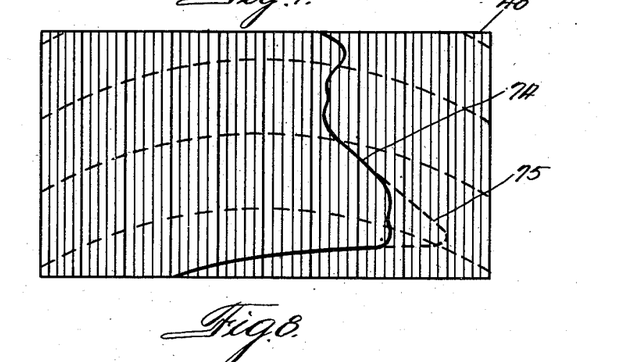

In Figs. 7 and 8, representative ink traces are shown which indicate false bearings, the ink trace 70 in Fig. 7 having a series of points 71, 72, and 73 which might easily have been mistaken for a true bearing if headphones had been used in the customary manner connected to the output of the receiver 29.

It is a relatively simple matter to teach even an unskilled operator that a trace having the general configuration shown in Fig. 6 and only that trace represents an accurate bearing. Accordingly, by mere inspection the operator can discard traces such as are shown in Fig. 7 from any single group, and thus eliminate all of those bearings which are obviously false. The erroneous trace illustrated in Fig. 7 may of course be due to fading and to deviation errors caused by minute-by-minute variations in the ionosphere. Preferably, the antenna arrangement is rotated at the rate of approximately 15 revolutions per minute, and by thus taking a relatively large number of traces during a short period it is possible to obtain one or more true bearings when fading is nonexistent, even though over the general period severe fading conditions may exist.

In Fig. 8 there is shown a chart having an ink trace 74 thereon which is identical with the ink trace 70 of Fig. 7, and superimposed on the trace 74 there is indicated in broken lines a trace 75 which would have been formed if no fading had been present. While movements or changes in the ionosphere during the time that a bearing is being recorded are indicated by irregularity in the trace 51, a true bearing may be located by comparing the portion of the false trace adjacent to the apparent minimum with a standard trace of a true bearing. Thus, if a trace corresponding to a true bearing is printed or otherwise made on a transparent card, formed for example of Plexiglas or other similar material, such a standard bearing may be superimposed on a bearing trace such as the bearing trace in Fig. 8, and it will immediately become apparent that the trace 74 represents a false bearing and may be discarded. Thus it is possible by comparison with a standard trace to eliminate the element of judgment, and even unskilled operators may readily discard all improper bearings and determine immediately those traces which represent true bearing readings.

In order to assure the accuracy of the bearings obtained, the loops 10 and 11, and hence the drum 49, may be allowed to rotate a number of times (at least 15) for each bearing desired. In this manner a number of bearings are superimposed one over the other and can be readily averaged to secure a resultant bearing more accurate than any individual bearing.

As heretofore mentioned, various errors may be introduced into the continuous records or traces obtained with the direction finder system illustrated in Fig. 1, due to the presence of static conditions, and in order to eliminate or minimize the effects of static the band-pass filter 39 is interposed in the output circuit of the radio receiver, as shown in Fig. 1, which band-pass filter is very sharply tuned so as to pass only a very narrow band of frequencies. As is the usual practice in radio direction finders used today for determining the position of airplanes on commercial airline systems, the receiver 29 of the direction finder system shown in Fig. 1 is capable of receiving only stations transmitting a carrier frequency having a fixed relation to the fixed frequency of oscillator 37, and the band-pass filter is tuned to pass only the beat note frequency resulting from the received carrier and the frequency of the oscillator 37.

It has been found, however, that the frequency of the transmitting station, although intended to be a fixed value, will vary over such a wide range that the beat note frequency supplied to the band-pass filter may vary as much as 750 cycles. Variations of this magnitude would of course mean that certain of these frequencies would not pass the filter 39, and in order to overcome this difficulty the arrangement illustrated in Fig. 2 is provided.

Figure 2:
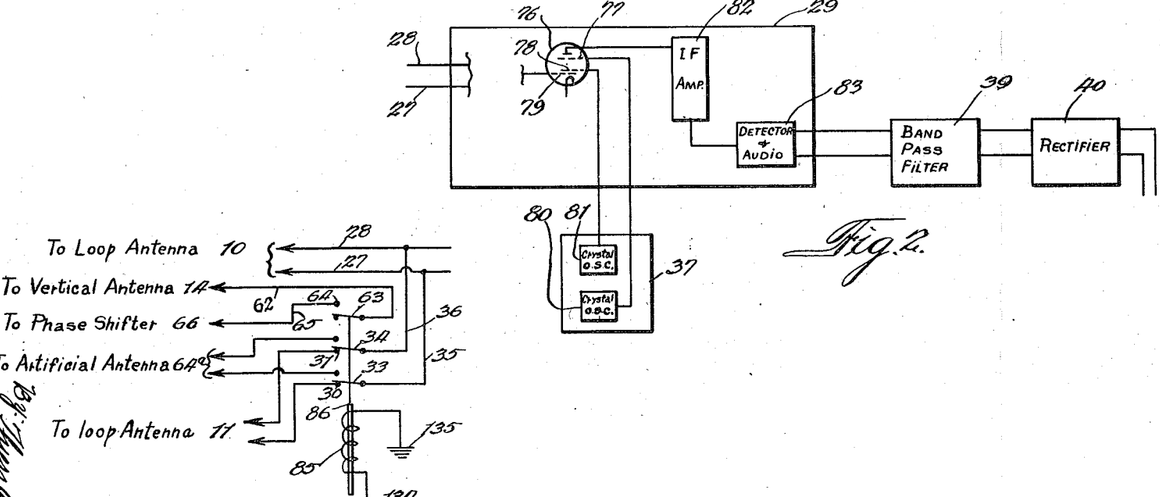
Fig. 2 is an illustrative circuit diagram of a portion of the system shown in Fig. 1, which is adapted to eliminate or minimize the effects of static on the continuous bearing records obtained.

In Fig. 2 the receiver 29, which receives the carrier frequency from the antenna arrangement through the conductors 27 and 28, is shown somewhat diagrammatically as including a converter tube 76 having a plurality of control electrodes 77, 78, and 79, the control electrode 79 being supplied with the carrier frequency through the radio frequency stage (not shown) of the receiver 29, and the control electrodes 77 and 78 being respectively connected, as shown, to separate crystal oscillators 80 and 81 which correspond to the oscillator means 37 of Fig. 1. The two crystal oscillators 80 and 81 are arranged to produce fixed frequencies, there being a frequency difference between the two oscillators equal to the frequency which the band-pass filter 39 is designed to pass.

For example, if the band-pass filter is designed to pass a frequency of 1020 cycles plus or minus 30, the frequencies of the crystal oscillators will be so selected as to have a frequency difference equal to 1020 cycles. When the frequencies of the two crystal oscillators and the carrier are impressed on the control electrodes of the converter tube 76, two beat frequencies will be generated equal respectively to the difference between the carrier frequency and the frequency of oscillator 80, and to the difference between the carrier frequency and the frequency of oscillator 81, and these two beat frequencies pass from the converter tube 76 to the I. F. amplifier indicated diagrammatically by the reference numeral 82. From the I. F. amplifier these frequencies pass to the detector and audio stage indicated diagrammatically and identified by the reference character 83, and beat together at the detector to form a beat note equal to the difference between the two intermediate frequencies. It will be found, upon analysis, that the frequency transmitted to the band-pass filter will always be equal to 1020 cycles, i. e., the difference between the frequencies of the two crystal oscillators, regardless of the carrier frequency of the transmitter, and accordingly the entire band will be successfully passed by the band-pass filter 39. By thus insuring that the entire useful frequency band transmitted to the band-pass filter 39 will be within the range of the filter, and by very sharply tuning the band-pass filter, the effects of static may be very substantially minimized or entire eliminated, and accordingly more accurate bearing traces will be obtained on the chart 48 of Fig. 1.

Figure 3:
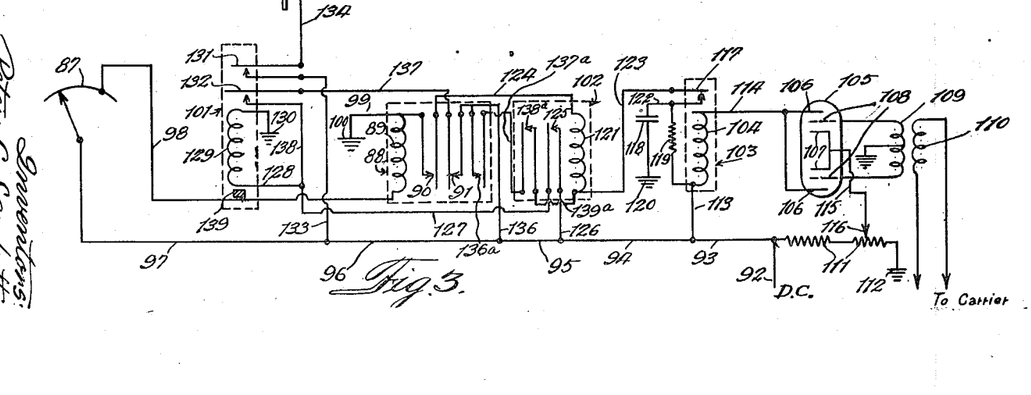
Fig. 3 is a circuit diagram of an automatic means for controlling the antenna connections selectively to produce a cardioid pattern in order to remove the bearing ambiguity.

In the direction finder system illustrated in Fig. 1, a manual switch 32 is shown for controlling the antenna connections so as to produce a cardioid pattern when desired, in order to remove the ambiguity from the true bearing records obtained on the chart 48, but it has been found desirable to provide automatic means for controlling the antenna connections in order to produce the cardioid, and in Fig. 3 there is shown means for automatically exercising a proper control of the antenna connections.

In Fig. 3 the coupling means for the antennas is illustrated as an electromagnetic relay or switch having an operating winding 85 and a movable magnetizable core or armature 86 arranged to operate a plurality of contacts 33, 34, and 63, which respectively correspond to the similarly numbered knife blades of the manual switch 32 in Fig. 1. This electromagnetic relay, which may be termed the cardioid relay, is likewise provided with the stationary contacts 30 and 31 which correspond to the similarly numbered contacts of the switch 32, and which are normally engaged by the movable contacts 33 and 34 for connecting the loop antenna 11 in parallel relation with the loop antenna 10 through the conductors 35, 26, 27, and 28, as described in connection with Fig. 1.

When the winding 85 of the cardioid relay is energized, the circuit of the loop antenna 11 is interrupted at the contacts 33 and 34 and the artificial antenna 64a is connected in parallel with the loop antenna 10 through an upper pair of contacts engaged by the movable contacts 33 and 34. At the same time, the movable contact 63 of the cardioid relay closes a circuit similar to that hereinbefore described in connection with Fig. 1, whereby the vertical antenna 14 is connected through the conductor 62, the contact 63, the stationary contact 64 and a conductor 65, and by way of the phase shifter 66 to the receiver 29. It will thus be apparent that the cardioid relay, when alternately energized and deenergized, effects the same circuit connections as are effected by throwing the manual switch 32 from one of its positions to the other.

In order properly to control the operation of the cardioid relay, a rotatable switch 87 is provided, which is preferably associated with the rotating post 13 of the antenna arrangement, and arranged to complete a circuit once during each revolution of the post 13. Closure of the switch 87 completes an energizing circuit for a control relay 88 having an energizing winding 89, two pairs of normally open contacts 90 and 136a, respectively, and a pair of normally closed contacts 91. This circuit may be traced from the positive side of a suitable source of energy indicated by the reference numeral 92, through the conductors 93, 94, 95, 96, and 97, the switch 87, the conductor 98, the relay winding 89, and by way of a conductor 99 to the negative side of the source of energy or a ground connection, indicated by the reference numeral 100.

Associated with the control relay 88 and the rotating switch means 87 are a plurality of additional control relays 101, 102, and 103, the energizing winding 104 of the relay 103 being connected in the output circuit of a full wave rectifier 105 having a pair of plates or anodes 106, a pair of cathodes 107, and a pair of control elements or grids 108. As shown, the grids or control elements 108 are adapted to be energized from a secondary winding 109 of a suitable coupling transformer, the primary winding 110 of which is connected to a suitable antenna for energization by the carrier of the transmitting station to which the radio direction finder system of Fig. 1 is tuned. The primary winding 110 is preferably connected to the system of Fig. 1 at a point between the filter 39 and the rectifier 40, or it may, if desired, be connected to an entirely separate antenna and receiver. In order to provide a constant negative bias on the control elements 108 of the rectifier tube 105, the midpoint of the secondary winding 109 is connected to ground as shown and the cathodes 107 are connected to a suitable potentiometer represented as comprising the resistance elements 111 connected across the direct current source of energy represented by the positive terminal 92 and the ground connection 112.

Whenever carrier energy is being supplied to the rectifier tube through the transformer, current will flow through the winding 104 of the control relay 103 through a circuit which extends from the positive source of energy 92 through the conductors 93 and 113, the winding 104, the conductor 114, the anodes 106, the cathodes 107, and by way of the conductor 115 to the movable contact 116 on the potentiometer 111.

In describing the operation of the automatic control means it will be assumed that power has been applied to the operating motors of the antenna arrangement, thereby operating the switch means 87, and that a carrier is being supplied to the winding 110 of the transformer so as to effect operation of the relay 104. Upon closure of the contacts 117 of the relay 104, a condenser 118 will effect energization of the relay 102, the condenser having previously been charged through a circuit which may be traced from the positive terminal 92, through the conductors 93 and 113, the resistor 119, conductor 122, and the condenser 118 to the ground connection 120. The energizing circuit for the relay 102 established by closure of the contacts 117 may be traced from one side of the condenser 118, through the conductor 122, the contacts 117, the conductor 123, the winding 121 of the relay 102, conductor 124, the contacts 90 on relay 88, which as previously described has been operated by closure of the switch means 87, and by way of the conductor 99 and the ground connections 100 and 120 to the other side of the condenser 118.

Following initial energization thereof, the relay 102 is held in its operated position by a holding circuit which may be traced from the positive terminal 92, through the conductors 93, 94, 95, and 136, contacts 136a, conductor 137a, contacts 138a, conductor 139a, the winding 121 of the relay 102, conductor 124, contacts 90, and by way of the conductor 99 to the ground connection 100.

Closure of the contacts 125 of the relay 102 establishes an energizing circuit for the winding 129 of the relay 101, which circuit may be traced from the positive terminal 92 through conductors 93, 94, and 126, contacts 125, conductors 127 and 128, and by way of the winding 129 to the ground connection 130. The relay 101 is thus operated and the energizing circuits thus far traced continue to exist until the circuit is broken at the contacts of the switch means 87, at which time the relay 88 is deenergized, allowing contacts 136a and 90 to open and contacts 91 to close. Opening of the contacts 136a interrupts the previously traced holding circuit for the relay 102, and the consequent opening of the contacts 125 on the relay 102 in turn interrupts the energizing circuit for the relay 101. Simultaneously, however, closure of the contacts 91 on the relay 88 provides a self-holding circuit for the relay 101, which may be traced from the positive terminal 92 through the conductors 93, 94, 95, and 136, contacts 91, conductor 137, contacts 132, conductors 138 and 128, and by way of the winding 129 to the ground connection 130. This transfer of the holding circuit for the relay 101 is accomplished without affecting the operated condition of the relay, because this relay is of the slow-to-release type as indicated diagrammatically in Fig. 3 by the usual copper slug 139.

Operation of the relay 101 of course causes closure of the relay contacts 131, thereby completing an energizing circuit for the cardioid relay which may be traced from the positive source of energy 92 through the conductors 93, 94, 95, 96, and 133, the contacts 131, the conductor 134, and by way of the operating winding 85 of the cardioid relay to the ground connection 135. Upon energization of this operating winding 85, the armature 86 of the cardioid relay is operated to its uppermost position so as to connect the vertical antenna in circuit through the contacts 63 and 64, as heretofore described. During the ensuing revolution of the antenna means a cardioid pattern is produced on the chart 48 of Fig. 1.

This connection exists until the contacts of the switch means 87 are again closed after one complete revolution of the rotatable post 13, whereupon the relay 88 will again be energized through the previously traced energizing circuit causing the contacts 91 to open and interrupt the previously traced self-holding circuit for the relay 101. The capacity of the condenser 118 and the ohmic resistance of the resistor 119 are so chosen that during successive closures of the contacts of the switch means 87 there will elapse an insufficient time to permit the accumulation on the condenser 118 of a charge of sufficient magnitude to effect operation of the relay 102. Therefore, even though the initial energizing circuit for the relay 102 is completed through the contacts 90 of the relay 88 when this relay is again operated, the relay 102 will not operate, and accordingly the relay 101 opens, thereby interrupting at contacts 131 the energizing circuit for the cardioid relay. Thus the cardioid relay returns to the position shown in the drawings, and the antenna circuits are connected with the parallel opposed loops in circuit as heretofore described. Due to the fact that the capacity and resistance values of the condenser 118 and the resistor 119, respectively, are chosen as indicated above, the operating cycle cannot be repeated until sufficient time has elapsed to permit the condenser 118 to attain a new charge of sufficient magnitude to operate the relay 102.

However, after the desired record has been made from which a true bearing may be located and the system has been allowed to rest for a relatively short time, operating voltage will build up across the condenser 118 and the above described cycle of operations may be repeated. Such an operating voltage will not build up across the condenser 118 until the system is allowed to rest because of the fact that the condenser is discharged each time the contacts 90 of the relay 88 close, the discharge however being insufficient to effect operation of the relay 102. In the preferred arrangement, control of the automatic cardioid control means illustrated in Fig. 3 may be accomplished by providing a manually operated control button or switch which serves simultaneously to connect the source of energy to the circuit of Fig. 3 and to the operating motors 15 and 50 of the radio direction finder system shown in Fig. 1, and it will be observed that when the energy source is thus connected, the above cycle of operations will automatically be carried out whenever a suitable carrier is applied to the primary winding 110.

Figure 4:
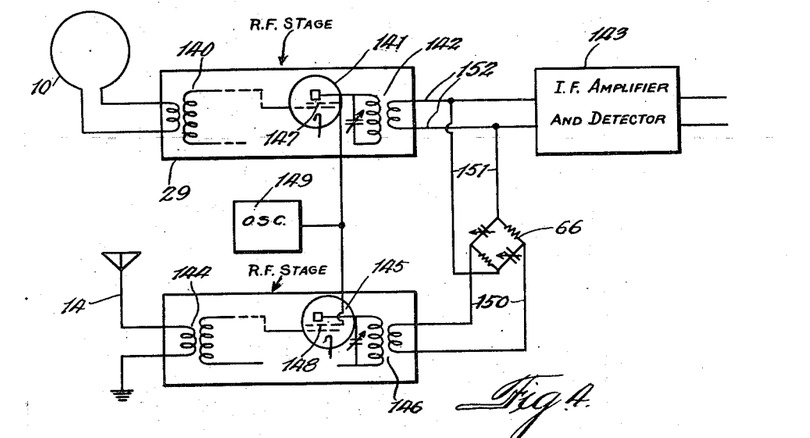
Fig. 4 is a circuit diagram of a somewhat modified arrangement including means for insuring constant phase shift between the respective inputs of the loop antenna and the vertical antenna, regardless of the frequency of the common carrier to which the respective antennas are tuned.

In Fig. 4 a somewhat modified arrangement of the circuits is shown which may be employed in the radio direction finder system of Fig. 1 in order to insure that the radio frequency energy received in the loop antenna 10 and the vertical antenna 14, when these two antennas are connected together for the production of a cardioid pattern, be shifted to the proper phase relation for production of a cardioid pattern at all times, even though the tuning of the antennas be variable so as to receive the carrier frequencies of transmitters operating on different radio frequencies. In the circuit shown in Fig. 4, the radio receiver 29 is represented diagrammatically as including a radio frequency stage having a tuning transformer 140 and a converter tube 141 connected by a converter transformer 142 to the intermediate amplifier and detector indicated diagrammatically by the reference numeral 143. The vertical antenna 14, instead of being connected directly to the phase shifter 66 of Fig. 1, is connected to a receiving means comprising a radio frequency stage identical with the radio frequency stage of the receiver 29 and comprising a tuning transformer 144, a converter tube 145, and a coupling transformer 146.

The converter tubes 141 and 145 are provided with control grids 147 and 148, respectively, which control grids are connected to a suitable radio frequency oscillator 149. The radio frequency supplied by the oscillator 149 bears a predetermined relation to the carrier frequency received from the two antennas, and accordingly beats therewith to generate identical intermediate frequencies. The coupling transformer 146 to which the intermediate frequency from the vertical antenna is supplied, is connected as shown through the conductors 150, the phase shifting device 66 and the conductors 151 to the conductors 152 which lead from the coupling transformer 142 of the vertical antenna to the intermediate frequency amplifier and detector 143.

Thus, the adjustment of the phase shifter 66, for effecting the desired phase shift in the energy received from the vertical antenna 14 with respect to the energy received through the loop antenna 10, is a function of the intermediate frequency only and will accomplish the proper phase shifting regardless of the frequency to which the two antennas are tuned. From the I. F. amplifier and detector 143 the combined energy from the two antennas is supplied through suitable conductors to the rectifier and the recording means of Fig. 1 so as to trace on the chart 48 an accurate cardioid pattern of the combined energy received.

Figure 5:
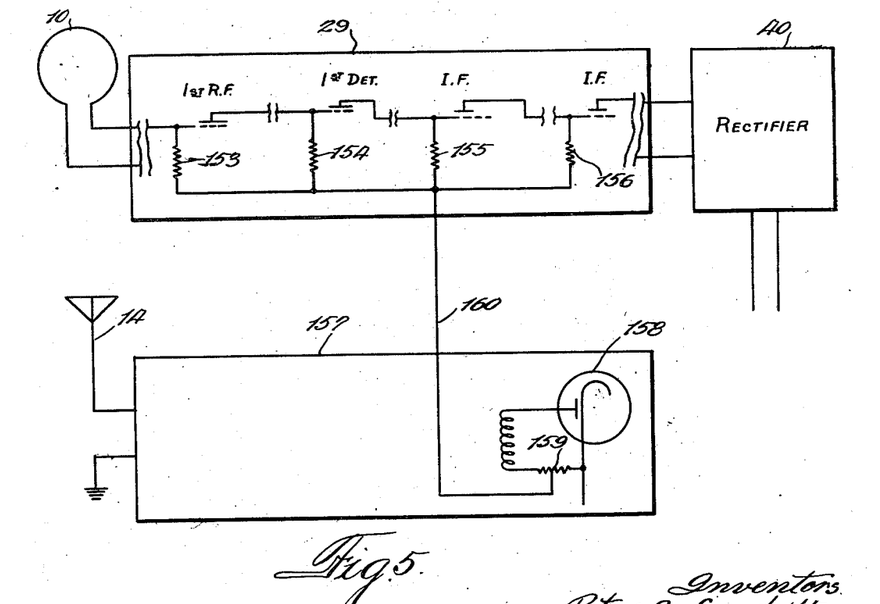
Fig. 5 is a circuit diagram of a still further modification, including automatic volume control means which will prevent overloading of the receiving means and correct for fading signals without being detrimental to the accuracy of the direction finder system.

In Fig. 5 there is shown a still further modified circuit arrangement which may be employed when it is desirable to prevent overloading the radio direction finder system shown in Fig. 1 without interfering with the accuracy of the variations of signal intensity received as a function of the position of the loop antennas. It will, of course, be clear that, if the usual automatic volume control is employed on the receiver 29 of Fig. 1, this control will tend to maintain constant the output of the receiver and thus will destroy the sharpness of the nulls used to determine the true bearing of the transmitter. In Fig. 5, however, an automatic volume control arrangement is shown which is not detrimental to the accuracy of the direction finder. As illustrated in Fig. 5, the loop antenna 10 is connected to a radio receiver which corresponds to the receiver 29 of Fig. 1 and is shown as including an R. F. stage, a first detector, and two I. F. amplifiers having the control elements of each tube connected together in the conventional manner through suitable resistors 153, 154, 155, and 156. The output from the receiver 29 may be connected through a suitable rectifier corresponding to the rectifier 40 of Fig. 1 to recording means for producing a trace of the signal intensity received by the antenna 10.

The vertical antenna 14 in this arrangement, however, is connected to a separate receiver indicated diagrammatically and identified by the reference numeral 157, which may be entirely conventional and which includes a detector 158 having a suitable resistance 159 connected in its output circuit. The rectified output of the detector 158 is, of course, a function of the signal intensity received on the vertical antenna and this rectified output is impressed by means of the conductor 160 on the gain control or grid circuits of the various elements of the directional receiver 29.

While the output of the receiver 29 supplied to the rectifier and recording means is a function of the position of the loop antenna 10 and the direction of the transmitter, this output will be substantially independent of variations in the carrier intensity due to the automatic volume control exercised by the connection to the detector output of the vertical antenna receiver 157, and accordingly overloading and errors due to fading are minimized or prevented. It will of course, be understood that use of the separate receiver 157 is in addition to, rather than in place of, the circuit connections for the vertical antenna shown in Figs. 1 and 4, the receiver 157 being separately coupled to the vertical antenna 14 or being energized from an entirely separate vertical antenna if desired.

As previously described and as shown in Fig. 1, the preferred directional antenna means comprises the loops 10 and 11 mounted on opposite ends of the horizontally extending beam 12 which is supported at its midpoint on the rotatable post 13. While the detailed mechanical structure of the beam 12 forms no part of this invention, it is important that the beam be sufficiently strong and rigid to withstand any tendency of the loops to twist relative to each other, as any such twisting would introduce diversity errors into the bearing readings.

Although the loops may be secured to the beam 12 in any desired relation thereto, they are preferably supported thereon at their lower edges, as shown, and the beam 12 may act as a horizontal antenna. Consequently it may be desirable, in order to minimize any coupling between the beam and the loops, to support the loops with a slight inclination from a true right angular vertical relation to the beam, although maintaining, of course, the substantially coaxial relation of the loops. The respective dimensions of the loops 10 and 11 and the spacing therebetween of course depends to a large extent upon the frequencies employed, the spacing of the loops being less than one-half wave length, and the entire antenna structure, as heretofore stated, is rotated at a constant speed which may preferably be on the order of 15 R. P. M.

While particular embodiments of the invention have been shown, it will, of course, be understood that the invention is not limited thereto, since modifications may be made, and it is therefore contemplated by the appended claims to cover any such modifications as fall within the true spirit and scope of the invention.

Having thus described our invention, what we claim and desire to secure by Letters Patent is:

1. A radio direction finder comprising a receiver, directional antenna means including a pair of loop antennas fixedly mounted with respect to each other in spaced substantially coaxial relation, means for rotating said antenna means at a substantially constant speed about an axis substantially parallel to the planes of said loops, a non-directional antenna, coupling means selectively operable to one of two positions to couple one of said loop antennas and said non-directional antenna to said receiver in parallel relation and to the other of said two positions to couple said pair of loop antennas to said receiver in opposed parallel relation, and recording means energizable in accordance with the output energy of said receiver for producing a lasting visual record of the signal intensities supplied to said receiver during rotation of said antenna means with said coupling means in either of said two positions.

2. A radio direction finder comprising a receiver, directional antenna means including a pair of loop antennas fixedly mounted with respect to each other in spaced substantially coaxial relation, means for rotating said antenna means at a substantially constant speed about an axis substantially parallel to the planes of said loops, a non-directional antenna, coupling means selectively operable to one of two positions to couple one of said loop antennas and said non-directional antenna to said receiver in parallel relation and to the other of said two positions to couple said pair of loop antennas to said receiver in opposed parallel relation, relay means responsive to rotation of said antenna means for automatically operating said coupling means between said two positions, and recording means energizable in accordance with the output energy of said receiver for producing a lasting visual record of the signal intensities supplied to said receiver during rotation of said antenna means with said coupling means in either of said two positions.

3. A radio direction finder comprising a receiver, directional antenna means including a pair of loop antennas fixedly mounted with respect to each other in spaced substantially coaxial relation, means for rotating said antenna means at a substantially constant speed about an axis substantially parallel to the planes of said loops, a non-directional antenna, coupling means selectively operable to one of two positions to couple one of said loop antennas and said non-directional antenna to said receiver in parallel relation and to the other of said two positions to couple said pair of loop antennas to said receiver in opposed parallel relation, and relay means controlled by rotation of said antenna means for initially operating said coupling means to said one position and for thereafter operating said coupling means to said other position upon completion of a predetermined rotation of said antenna means.

4. A radio direction finder comprising a receiver, directional antenna means including a pair of loop antennas fixedly mounted with respect to each other in spaced substantially coaxial relation, means for rotating said antenna means at a substantially constant speed about an axis substantially parallel to the planes of said loops, a non-directional antenna, coupling means selectively operable to one of two positions to couple one of said loop antennas and said non-directional antenna to said receiver in parallel relation and to the other of said two positions to couple said pair of loop antennas to said receiver in opposed parallel relation, recording means energizable in accordance with the output energy of said receiver for producing a lasting visual record of the signal intensities supplied to said receiver during rotation of said antenna means with said coupling means in either of said two positions, and relay means controlled by rotation of said antenna means for initially operating said coupling means to said one position to produce a cardioid pattern on said recording means, and for operating said coupling means to said other position after completion of said cardioid pattern to record the signal intensity supplied to said receiver during subsequent rotations of said opposed loops.

5. In a radio direction finder having directional antenna means including a plurality of antennas adapted to be selectively coupled together in predetermined different circuit relations, and a rotating part the compass position of which is reflected in the signal intensity output of said antenna means, the combination of coupling means operable between two positions to vary the said circuit relations of said antennas, a source of energy, means connected to said source for storing a charge of energy during idle periods of said direction finder, means jointly responsive to rotation of said antenna part and to a carrier received by said antenna means for discharging said stored energy to operate said coupling means to one of said positions, means effective upon completion of a predetermined rotation of said part for operating said coupling means to the other of said positions, and means for preventing recharging of said energy storing means during further rotation of said antenna part.

6. A radio direction finder comprising a receiver, directional antenna means including a pair of loop antennas fixedly mounted with respect to each other in spaced apart relation, means for rotating said antenna means at a substantially constant speed about a substantially vertical medial axis, a non-directional antenna, coupling means selectively operable to one of two positions to couple one of said loop antennas and said non-directional antenna to said receiver in parallel relation and to the other of said two positions to couple said pair of loop antennas to said receiver in opposed parallel relation, and recording means energizable in accordance with the output energy of said receiver for producing a lasting visual record of the signal intensities supplied to said receiver during rotation of said antenna means with said coupling means in either of said two positions.

7. A radio direction finder comprising a receiver, directional antenna means including a pair of loop antennas fixedly mounted with respect to each other in spaced apart relation, means for rotating said antenna means at a substantially constant speed about a substantially vertical medial axis, a non-directional antenna, coupling means selectively operable to one of two positions to couple one of said loop antennas and said non-directional antenna to said receiver in parallel relation and to the other of said two positions to couple said pair of loop antennas to said receiver in opposed parallel relation, recording means energizable in accordance with the output energy of said receiver for producing a lasting visual record of the signal intensities supplied to said receiver during rotation of said antenna means with said coupling means in either of said two positions, and means for comparing with a standard bearing record the continuous visual record produced during said opposed parallel connection of said loops to evaluate by inspection the compass bearing quality of said continuous record.

8. A radio direction finder comprising a receiver, directional antenna means coupled to said receiver and having a rotatable part the compass position of which is reflected in the signal intensity received from said antenna means, recording means including a pair of relatively movable parts respectively comprising a recording surface and a co-operating tracing element, means for rotating said rotatable part of said antenna means at a constant speed, means for moving one of said parts of said recording means in synchronism with said antenna part, means for periodically recording on said surface a reference position of said antenna part, means for moving the other of said parts of said recording means in accordance with the output of said receiver to form on said recording surface a continuous record of the signal intensity received from said antenna means, and means for determining from said continuous record of signal intensity the behavior of the radio wave propagating medium during the time of operation of said radio direction finder.

9. A radio direction finder comprising a receiver, directional antenna means coupled to said receiver and having a rotatable part the compass position of which is reflected in the signal intensity received from said antenna means, recording means including a pair of relatively movable parts respectively comprising a recording surface and a co-operating tracing element, means for rotating said rotatable part of said antenna means at a constant speed, means for moving one of said parts of said recording means in synchronism with said antenna part, means for moving the other of said parts of said recording means in accordance with the output of said receiver to form on said recording surface a continuous record of the signal intensity received from said antenna means, means controlled by the rotation of said rotatable antenna part for automatically orienting said continuous record with respect to the compass position of said antenna part, and means for comparing said continuous record with a standard record to produce an evaluation of the compass bearing quality.

10. A radio direction finder comprising a receiver, directional antenna means coupled to said receiver and having a rotatable part the compass position of which is reflected in the signal intensity of said antenna means, recording means including a pair of relatively movable parts respectively comprising a recording surface and a co-operating tracing element, means for rotating said rotatable part of said antenna means at a constant speed, means for rotating one of said parts of said recording means in synchronism with said antenna part, means controlled by the rotation of said rotatable antenna part for automatically recording on said surface a reference position of said antenna part, means for moving the other of said parts of said recording means in accordance with the output of said receiver to form on said recording surface during each revolution of said one part and said antenna part a continuous record of the signal intensity received from said antenna means, the continuous records formed during successive revolutions being superimposed on said recording surface to provide a resultant average of said signal intensity, and comparative means comprising a transparent element having a standard bearing trace thereon for determining by comparison with each of said records the quality of the compass bearing indicated thereby.

11. The method of determining the bearing quality characteristics of portions of a continuously recorded trace of the signal intensity received by a radio direction finder receiver, which comprises preparing on a transparent medium a standard bearing trace corresponding to a true bearing trace for the said receiver, superimposing said transparent medium on the continuous record of said signal intensity, and causing portions of said standard bearing trace to coincide with portions of said signal intensity trace visually to establish the character of variations from said standard bearing trace in other portions of said signal intensity trace.

12. In a radio direction finder having directional antenna means including a plurality of antennas adapted to be selectively coupled together in predetermined different circuit relations and a rotating part the compass position of which is reflected in the signal intensity output of said antenna means, the combination of coupling means operable between two positions to vary the said circuit relations of said antennas, means for operating said coupling means, relay means for selectively energizing said operating means to operate said coupling means between said two positions, and interlock means for rendering said relay means effective to energize said operating means only when a carrier is being received by said antenna means.

13. In a radio direction finder having directional antenna means including a plurality of antennas adapted to be selectively coupled together in predetermined different circuit relations and a constant speed rotating part the compass position of which is reflected in the signal intensity output of said antenna means, the combination of coupling means operable between two positions to vary the said circuit relations of said antennas, relay means controlled by rotation of said antenna part for selectively operating said coupling means between said two positions, and interlock means for rendering said relay means effective to operate said coupling means only when a carrier is being received by said antenna means.

14. In a radio direction finder having directional antenna means including a plurality of antennas adapted to be selectively coupled together in predetermined different circuit relations and a constant speed rotating part the compass position of which is reflected in the signal intensity output of said antenna means, the combination of coupling means operable between two positions to vary the said circuit relations of said antennas, relay means controlled by rotation of said antenna part for selectively operating said coupling means between said two positions, said relay means including interlock means responsive to a carrier received by said antenna means for preventing operation of said coupling means when a carrier is not being received by said antenna means.

15. A radio direction finder responsive to frequencies in the range wherein bearing determinations are affected by the characteristics of the ionosphere, comprising directional antenna means including a pair of loops fixedly mounted with respect to each other in spaced substantially coaxial relation, means for rotating said antenna means at a substantially constant speed about substantially the vertical axis of symmetry of said spaced loops, receiver means adapted to produce in the output circuit thereof a signal intensity continuously proportional to the signal intensity supplied to the input circuit thereof, means coupling said receiver means to said antenna means whereby the compass position of said loops is reflected in the signal intensity supplied to said receiver means, recording means including a pair of relatively movable parts respectively comprising a recording surface and a co-operating tracing element, means for moving one of said parts in synchronism with the rotation of said antenna means, and means for moving the other of said parts in accordance with the output of said receiver means to form on said recording surface a continuous record of the signal intensity received from said spaced loops.

16. A radio direction finder responsive to frequencies in the range wherein bearing determinations are affected by the characteristics of the ionosphere, comprising directional antenna means including a pair of loops fixedly mounted with respect to each other in spaced substantially coaxial relation, means for rotating said antenna means at a substantially constant speed about substantially the vertical axis of symmetry of said spaced loops, receiver means adapted to produce in the output circuit thereof a signal intensity continuously proportional to the signal intensity supplied to the input circuit thereof, means coupling said receiver means to said antenna means whereby the compass position of said loops is reflected in the signal intensity supplied to said receiver means, recording means including a pair of relatively movable parts respectively comprising a recording surface and a co-operating tracing element, means for moving one of said parts in synchronism with the rotation of said antenna means, means for moving the other of said parts in accordance with the output of said receiver means to form on said recording surface a continuous record of the signal intensity received from said spaced loops, and means for periodically recording on said surface a reference position of said loops relative to said continuous record.

17. A radio direction finder responsive to frequencies in the range wherein bearing determinations are affected by the characteristics of the ionosphere, comprising directional antenna means including a pair of loops fixedly mounted with respect to each other in spaced substantially coaxial relation, means for rotating said antenna means at a substantially constant speed about substantially the vertical axis of symmetry of said spaced loops, receiver means adapted to produce in the output circuit thereof a signal intensity continuously proportional to the signal intensity supplied to the input circuit thereof, means coupling said receiver means to said antenna means whereby the instantaneous compass positions of said loops during rotation are reflected in the instantaneous signal intensities supplied to said receiver, and recording means energizable in accordance with the output of said receiver means for producing a lasting record trace proportional at all points to the signal intensities received from said spaced loops.

PETER C. SANDRETTO.
ELMER P. BUCKTHAL.